United States Patent
Bristol et al.

(10) Patent No.: US 10,338,637 B1
(45) Date of Patent: Jul. 2, 2019

(54) ADJUSTABLE STRAP ASSEMBLY FOR A HEAD-MOUNTED DISPLAY

(71) Applicant: FACEBOOK TECHNOLOGIES, LLC, Menlo Park, CA (US)

(72) Inventors: Peter Wesley Bristol, Seattle, WA (US); Mauricio Romano, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 3 days.

(21) Appl. No.: 15/716,146

(22) Filed: Sep. 26, 2017

(51) Int. Cl.
   *G02B 27/01* (2006.01)
   *G06F 1/16* (2006.01)
   *A45F 5/00* (2006.01)

(52) U.S. Cl.
   CPC .............. *G06F 1/163* (2013.01); *A45F 5/00* (2013.01)

(58) Field of Classification Search
   CPC ........... A61M 16/0633; G02B 27/0176; G02B 23/125; G02B 27/017
   USPC ........................................ 224/181; D14/372
   See application file for complete search history.

(56) References Cited

U.S. PATENT DOCUMENTS

| | | | | |
|---|---|---|---|---|
| 4,694,823 A | * | 9/1987 | Young | A61F 13/122 2/171.2 |
| 4,888,831 A | * | 12/1989 | Oleson | A42B 3/145 2/420 |
| 5,542,128 A | * | 8/1996 | Lomas | A61M 16/0683 128/207.11 |
| 5,895,363 A | * | 4/1999 | Preijde | A63B 23/0244 434/258 |
| D536,092 S | * | 1/2007 | Amarasinghe | D24/110 |
| 7,779,832 B1 | * | 8/2010 | Ho | 128/201.22 |
| D732,028 S | * | 6/2015 | Kim | D14/372 |
| D829,208 S | * | 9/2018 | Dallmeyer | D14/372 |

OTHER PUBLICATIONS

Hook and Loop Fastener; https://en.wikipedia.org/wiki/Hook_and_loop_fastener; as accessed Sep. 1, 2017 (dated Dec. 15, 2015).
Snap Fastener; https://en.wikipedia.org/wiki/Snap_fastener; as accessed Sep. 1, 2017 (dated Jul. 9, 2005).

* cited by examiner

*Primary Examiner* — Adam J Waggenspack
(74) *Attorney, Agent, or Firm* — FisherBroyles, LLP

(57) ABSTRACT

The disclosed strap assembly may include an axial strap, connected to a head-mounted display, configured to be worn around the circumference of a user's head in a manner that holds the head-mounted display against the user's face. The axial strap may include a left axial section and a right axial section. The strap assembly may also include an adjustable attachment mechanism configured to removably attach the right axial section to the left axial section at the back of the user's head. Additionally, the strap assembly may include a top strap, configured to be worn along the top of the user's head. The top strap may include (1) a ventral end coupled to a medial section of the head-mounted display and (2) a dorsal end that splits into a left dorsal end and a right dorsal end, each of which couples to the axial strap.

20 Claims, 10 Drawing Sheets

ADJUSTABLE STRAP ASSEMBLY FOR A HEAD-MOUNTED DISPLAY

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be an ill-fitting headset. Traditional virtual reality headsets may provide some options for addressing a poor fit, but these options may be sub-optimal. For example adjusting a traditional headset for comfortable facial pressure and proper size may involve making complicated manual changes over several fitting attempts. This process may be surprisingly time-consuming, and for some users, finding a good fit may be quite difficult. The instant disclosure, therefore, identifies a need for improved systems and methods that simply the fitting of virtual reality headsets.

SUMMARY

As will be described in greater detail below, the instant disclosure generally relates to an adjustable head-mounted-display strap assembly. In one example, the strap assembly may include an axial strap, connected to a head-mounted display, configured to be worn around the circumference of a user's head in a manner that holds the head-mounted display against the user's face. The axial strap may include (1) a left axial section, coupled to a left side of the head-mounted display, configured to be worn around the left side of the user's head and (2) a right axial section, coupled to a right side of the head-mounted display, configured to be worn around the right side of the user's head. The strap assembly may also include an adjustable attachment mechanism configured to removably attach the right axial section to the left axial section. In some examples, the strap assembly may also include a top strap, configured to be worn along the top of the user's head. In these examples, the top strap may include (1) a ventral end coupled to a medial section of the head-mounted display and (2) a dorsal end that splits into a left dorsal end and a right dorsal end, each of which couples to the axial strap. The left dorsal may be configured to be worn against the left side of the user's head and the right dorsal end may be configured to be worn against the right side of the user's head.

In one embodiment, the adjustable attachment mechanism may be configured to removably attach the right axial section to the left axial section such that the right axial section overlaps the left axial section. The amount of overlap between the right axial section and the left axial section may be adjustable. In this embodiment, the left dorsal end of the top strap may connect to the left axial section of the axial strap and the right dorsal end of the top strap may connect to the right axial section of the axial strap. Alternatively, the right dorsal end of the top strap may connect to the left axial section of the axial strap and the left dorsal end of the top strap may connect to the right axial section of the axial strap.

In an alternate embodiment the adjustable attachment mechanism may be configured to removably attach the right axial section to the left axial section such that the left axial section overlaps the right axial section. The amount of overlap between the right axial section and the left axial section may be adjustable. In this embodiment, the left dorsal end of the top strap may connect to the left axial section of the axial strap and the right dorsal end of the top strap may connect to the right axial section of the axial strap. Alternatively, the right dorsal end of the top strap may connect to the left axial section of the axial strap and the left dorsal end of the top strap may connect to the right axial section of the axial strap.

The adjustable attachment mechanism may represent a variety of mechanisms, including (without limitation) (1) a hook and loop fastener system, (2) a snap fastener system, and/or (3) a strap adjuster system. In one example, the head-mounted display may represent a virtual reality headset.

In some examples, the instant disclosure presents a head-mounted-display system that includes a head-mounted display and a strap assembly with at least one of the features described above. In some embodiments, the instant disclosure presents a method for positioning an adjustable strap assembly with at least one of the features described above on a user's head. In these embodiments, positioning the strap assembly on the user's head may include (1) positioning an axial strap circumferentially around the user's head with a left axial section being positioned around the left side of the user's head and a right axial section being positioned around the right side of the user's head and (2) positioning a top strap along the top of the user's head such that a left dorsal end of the top strap is positioned against the left side of the user's head and a right dorsal end of the top strap is positioned against the right side of the user's head. The method may also include removably attaching, at the back of the user's head, the left axial section of the axial strap to the right axial section of the axial strap such that a pressure exerted by the attached strap assembly holds the head-mounted display in place against the user's face.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
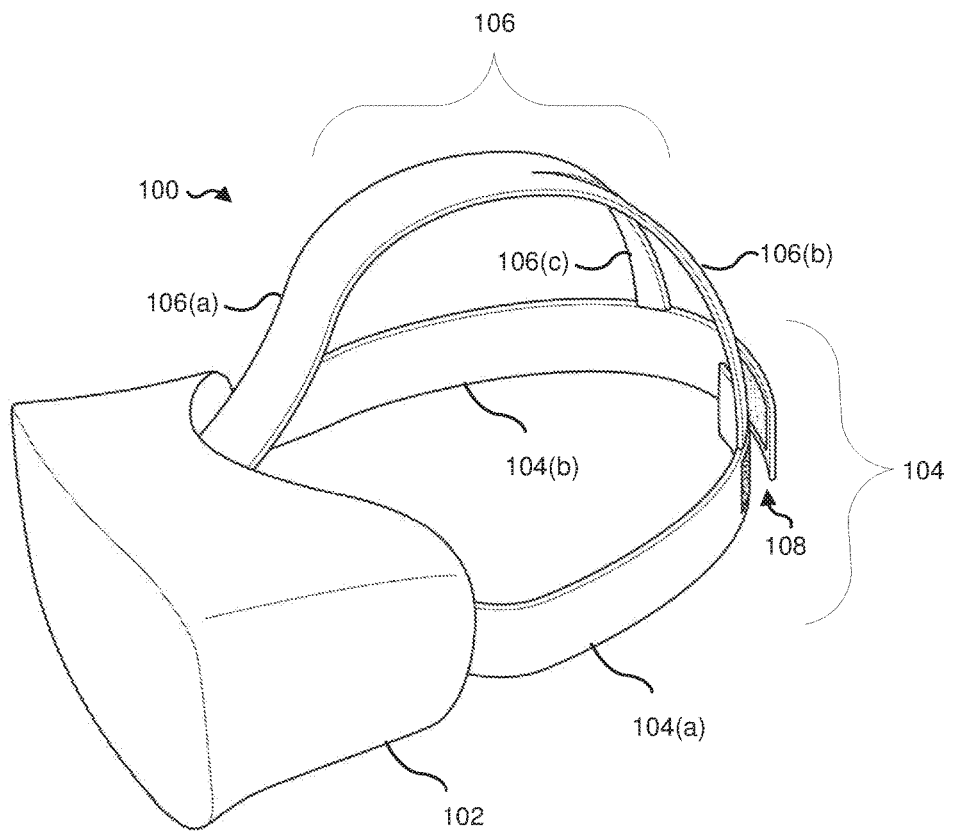
FIG. 1 is a perspective view of an adjustable strap assembly for a head-mounted display.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The disclosure provided herein describes and illustrates numerous exemplary adjustable strap assemblies that hold a head-mounted display against a user's face. One exemplary strap assembly may include (1) an axial strap, which straps around the circumference of a user's head and (2) a top strap, which straps along the top of the user's head from the front of the user's head to the back of the user's head. At the front of the user's head, the top strap may connect to a head-mounted display such that the head-mounted display rests over the user's face (e.g., over his or her eyes). At the back of the user's head, the top strap may split in two. Each split end may, at the back of the user's head, connect to the axial strap. When placed on the user's head, the two split ends may be pulled apart such that the two split ends form a triangular shape with the axial strap.

In some examples, the axial strap may also connect to the head-mounted display. In one such example, the axial strap may include a left portion, which attaches to the left side of the head-mounted display, and a right portion, which attaches to the right side of the head-mounted display. In this example, the left and right portions of the axial strap may removably attach to one another at the back of the user's head.

The two portions of the axial strap may removably attach using any suitable attachment mechanism (e.g., snaps, ladder locks, VELCRO, etc.). In one example, the attachment mechanism may allow the two portions of the axial strap to attach at various attachment points along the length of at least one of the portions, allowing a user to easily adjust the size of the axial strap with a single adjustment (e.g., by adjusting the amount of overlap between the two portions of the axial strap). In some embodiments, the disclosed strap assemblies may also include a second adjustment mechanism at the front of the top strap (e.g., between the top strap and the head-mounted display), allowing the user to easily adjust the length of the top strap.

The strap assemblies described herein may provide various features and advantages over conventional strap assemblies. For example, due to the simplicity of the strap assemblies described herein, the strap assemblies may be quickly and easily adjusted to fit a variety of user head sizes with just one or two adjustments (e.g., by simply adjusting an amount of overlap between the two portions of the axial strap and/or by adjusting the length of the top strap). Then, the triangular shape formed by the two split ends of the top strap and the axial strap may ensure a comfortable and secure fit for the variety of user head sizes. Additionally, because the disclosed adjustment solution may occur in a central location on a user's head (e.g., at the back or front of the head), the disclosed strap assemblies may easily remain centered on a user's head after an adjustment is made. Thus, as will be discussed in greater detail below, these and other disclosed embodiments, whether used alone or in combination, may help optimize the immersiveness, enjoyability, and/or utility of a virtual- or augmented-reality experience.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

The following will provide, with reference to FIGS. 1-8, examples of adjustable strap assemblies for a head-mounted display. In addition, the discussion corresponding to FIGS. 9-10 will provide examples of methods for manufacturing, assembling, configuring, and/or using the head-mounted-display adjustment mechanisms presented herein.

FIG. 1 is a perspective view of a strap assembly 100 for mounting a head-mounted display 102 to the head of a user. The term "strap," as used herein, generally refers to any strip of material (plastic, leather, cloth, woven, neoprene, etc.) used to fasten, secure, or otherwise couple one object (e.g., a head-mounted display) to another (e.g., a user's head). The straps discussed in the present disclosure may be of any suitable shape, size, flexibility, or elasticity (e.g., stretchable or non-stretchable).

The term "head-mounted display," as used herein, generally refers to any type or form of display device or system that is worn on or about a user's face and displays visual content to the user. Head-mounted displays may display content in any suitable way, including via a screen (e.g., a liquid crystal display (LCD) or light-emitting diode (LED) screen), a projector, a cathode ray tube, an optical mixer, etc. Head-mounted displays may display content in one or more media formats. For example, a head-mounted display may display video, photos and/or computer-generated imagery (CGI).

Head-mounted displays may provide diverse and distinctive user experiences. Some head-mounted displays may provide virtual-reality experiences (e.g., they may display computer-generated or pre-recorded content), while other head-mounted displays may provide real-world experiences (e.g., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

Figure 2:
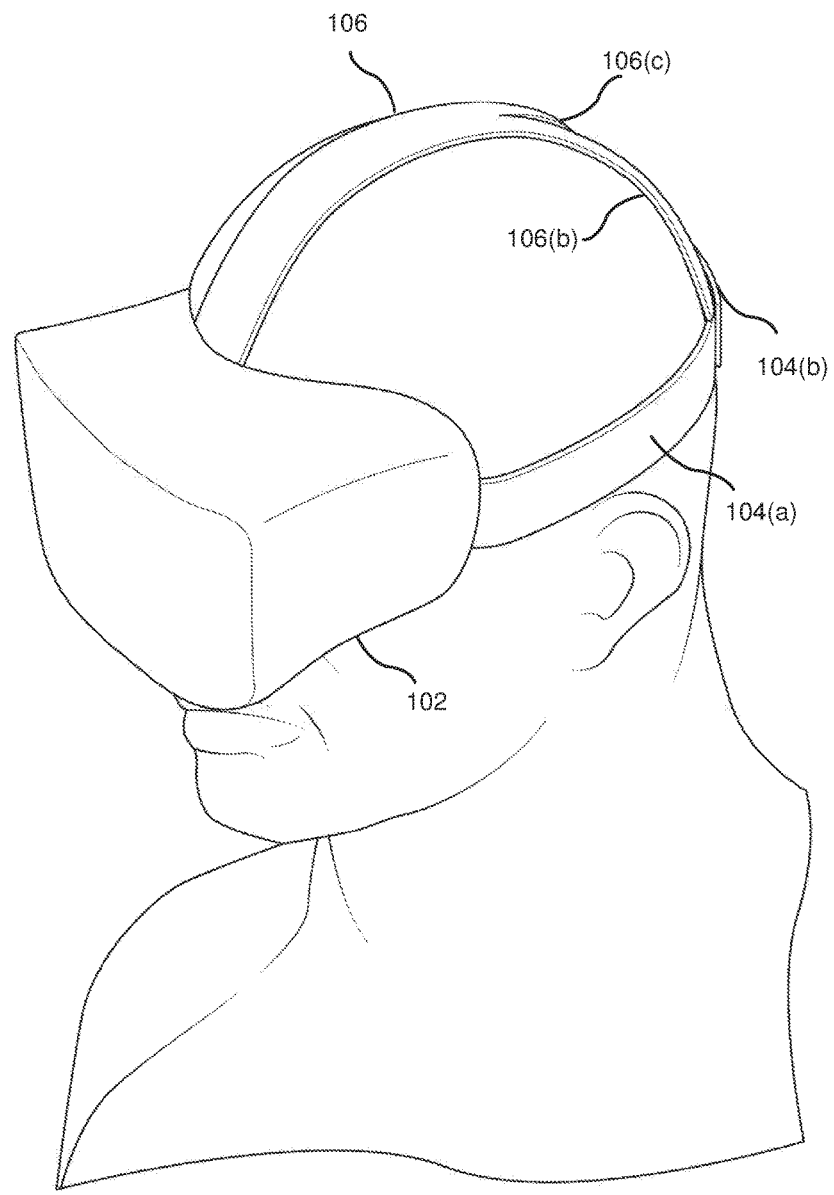
FIG. 2 is a perspective view of the adjustable strap assembly of FIG. 1 positioned on a user's head.
Figure 3:
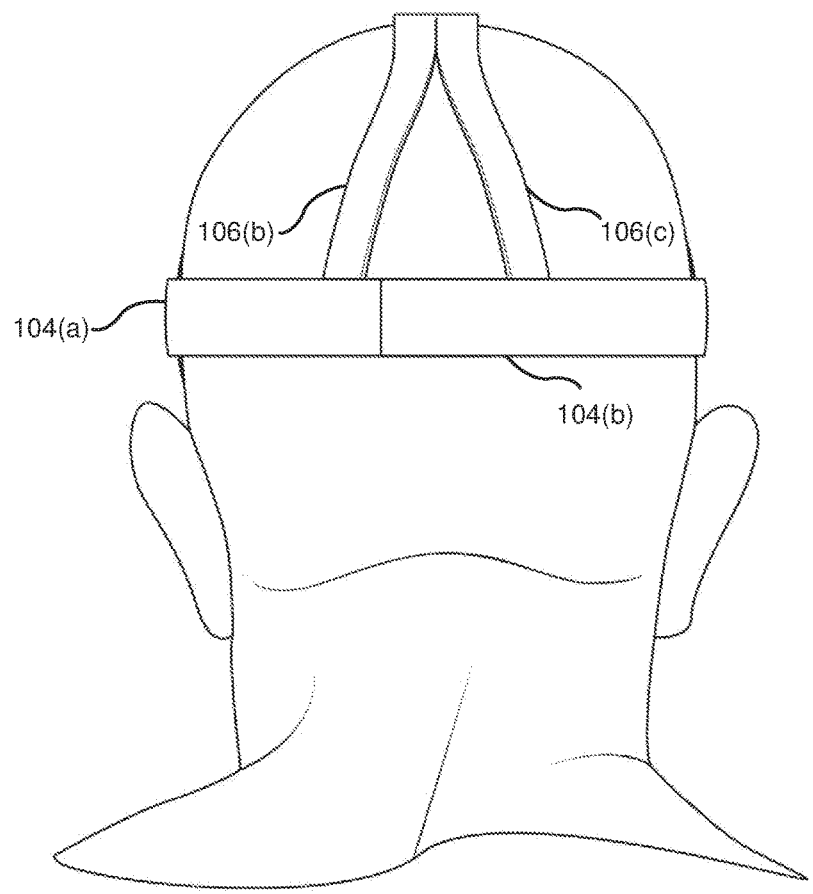
FIG. 3 is a posterior view of the adjustable strap assembly of FIG. 1 positioned on a user's head.
Figure 4:
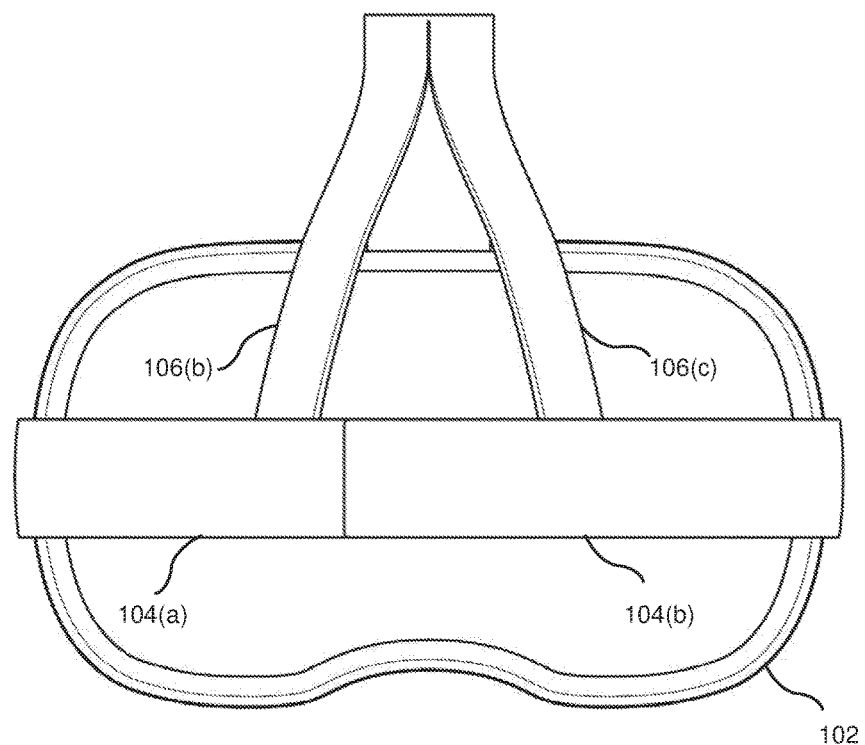
FIG. 4 is a posterior view of the adjustable strap assembly of FIG. 1 not positioned on a user's head.

As shown in FIG. 1, strap assembly 100 may include an axial strap 104 with a left axial section 104(a), coupled to a left side of head-mounted display 102, and a right axial section 104(b), coupled to a right side of head-mounted display 102. As illustrated in FIG. 2, axial strap 104 may be configured to be worn around the circumference of a user's head such that axial strap 104 pulls head-mounted display 102 against the face of the user such that head-mounted display 102 stays securely fixed against the user's face. As shown in FIGS. 2-3, left axial section 104(a) may be configured to be worn around the left side of the user's head and right axial section 104(b) may be configured to be worn around the right side of the user's head.

Returning to FIG. 1, strap assembly 100 may also include a top strap 106. Top strap 106 may be configured to be worn along the top of the user's head, as illustrated in FIGS. 2-3. In some examples (e.g., as shown in FIGS. 1-5 and FIG. 7), top strap 106 may include a ventral end 106(a), which attaches to a medial section of head-mounted display 102, and a dorsal end that splits into a left dorsal end 106(b) and a right dorsal end 106(c), each of which may be coupled to axial strap 104.

In some embodiments, left dorsal end 106(b) may be configured to be worn against the left side of the user's head and right dorsal end 106(c) may be configured to be worn against the right side of the user's head as illustrated in FIGS. 2-3. In these embodiments the dorsal ends of top strap 106 may, when attached to axial strap 104, form a generally triangular shape (as shown, e.g., in FIGS. 3-4). In some examples the triangular shape may ensure that the weight of the top strap is evenly distributed on the user's head and/or that strap assembly 100 fits securely and snugly around the user's head. The triangular shape may also help ensure that strap assembly 100 remains centered on the user's head.

Figure 5:
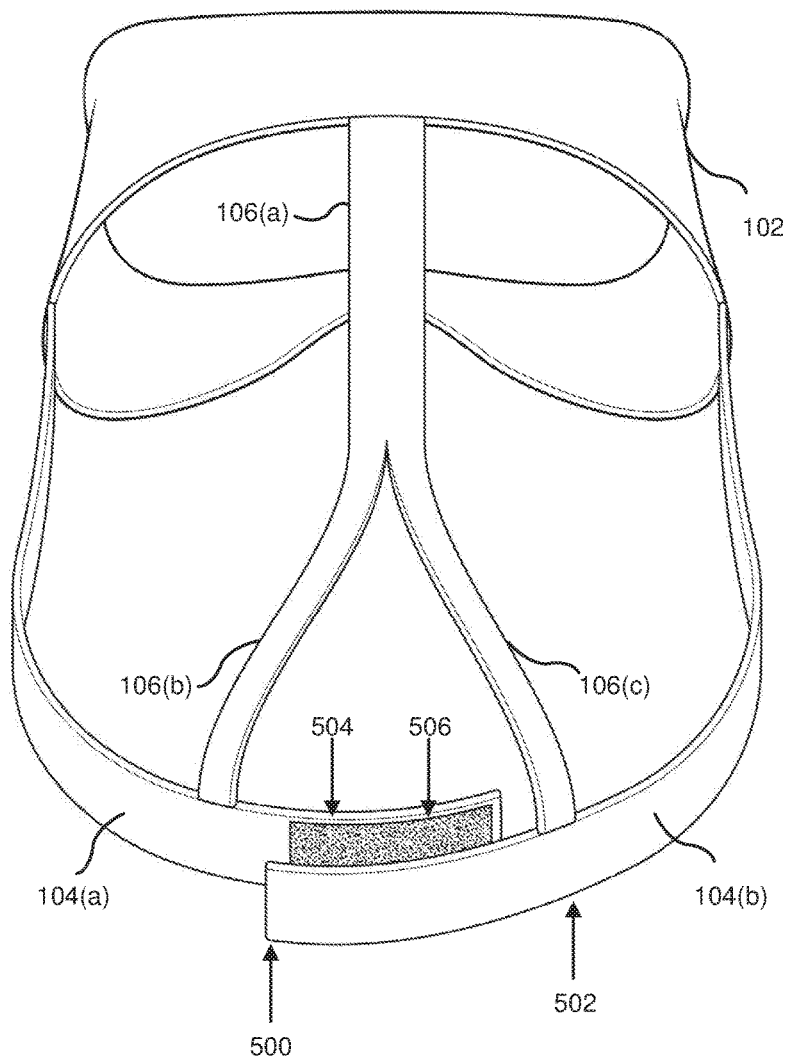
FIG. 5 is a superior perspective view of the adjustable strap assembly of FIG. 1 in which a right axial section of an axial strap overlaps a left axial section of the axial strap.
Figure 6A:
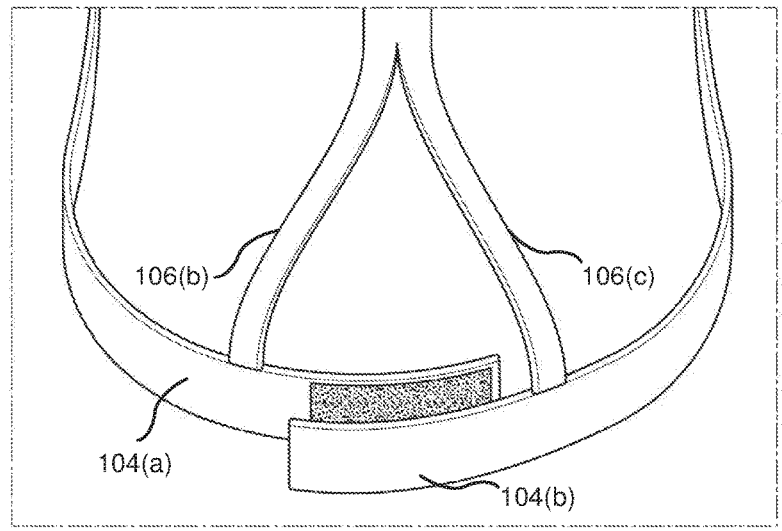
FIG. 6A is a posterior perspective view of the adjustable strap assembly of FIG. 5 in which a left dorsal end of a top strap attaches to the left axial section of the axial strap and a right dorsal end of the top strap attaches to a right axial section of the axial strap.
Figure 6B:
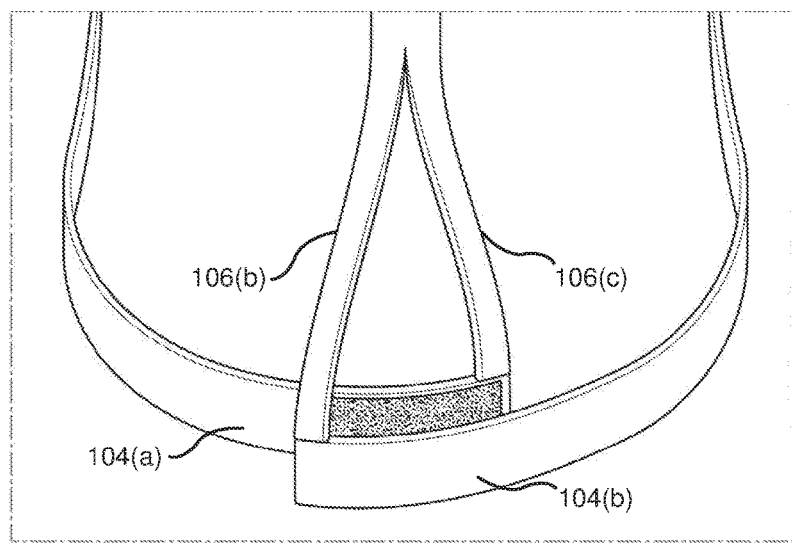
FIG. 6B is a posterior perspective view of the adjustable strap assembly of FIG. 5 in which the right dorsal end of the top strap attaches to the left axial section of the axial strap and the left dorsal end of the top strap attaches to a right axial section of the axial strap.
Figure 7:
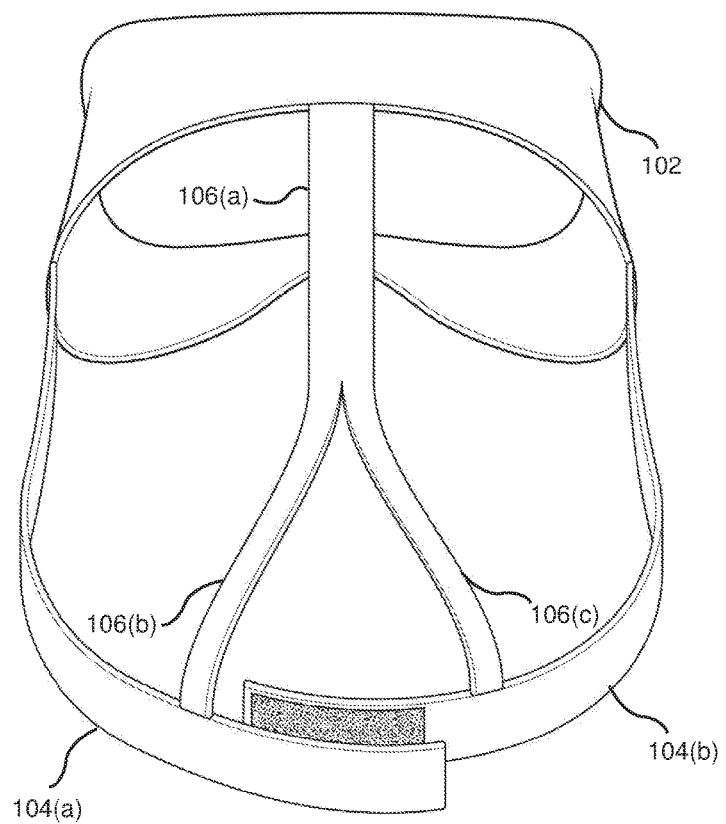
FIG. 7 is a superior perspective view of an adjustable strap assembly for a head-mounted display in which a left axial section of an axial strap overlaps a right axial section of the axial strap.
Figure 8A:
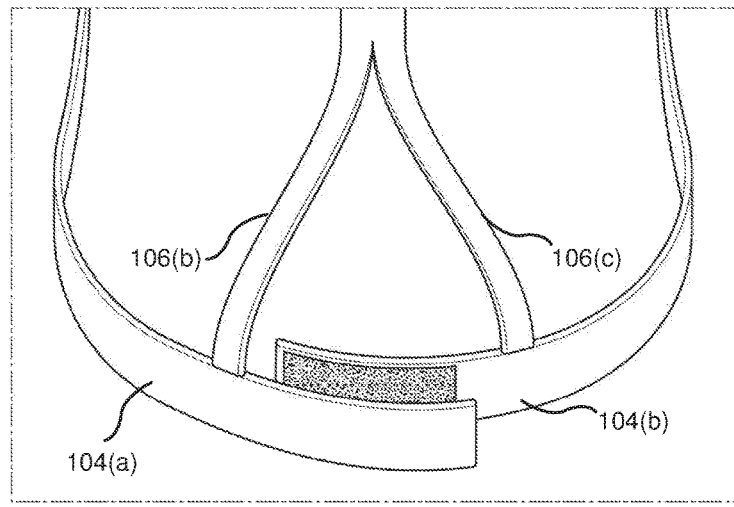
FIG. 8A is a posterior perspective view of the adjustable strap assembly of FIG. 7 in which a left dorsal end of a top strap attaches to the left axial section of the axial strap and a right dorsal end of the top strap overlaps a right axial section of the axial strap.
Figure 8B:
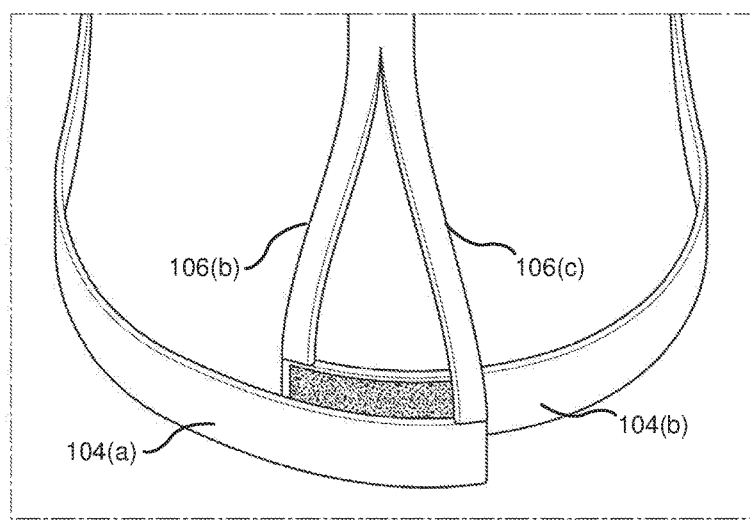
FIG. 8B is a posterior perspective view of the adjustable strap assembly of FIG. 7 in which a right dorsal end of the top strap attaches to the left axial section of the axial strap and a left dorsal end of the top strap attaches to a right axial section of the axial strap.

In one embodiment, strap assembly 100 may also include an attachment mechanism (e.g., attachment mechanism 108 illustrated in FIG. 1) configured to removably attach right axial section 104(b) to the left axial section 104(a). In some embodiments, the attachment mechanism may be configured to fasten the two axial sections such that right axial section 104(b) overlaps left axial section 104(a), as illustrated in FIGS. 5, 6A, and 6B. In other embodiments, the attachment mechanism may be configured to fasten the two axial sections such that left axial section 104(a) overlaps right axial section 104(b), as illustrated in FIGS. 7, 8A, and 8B.

In examples in which right axial section 104(b) overlaps left axial section 104(a), the dorsal ends of top strap 106 may connect to axial strap 104 in at least two ways. First, left dorsal end 106(b) may connect to left axial section 104(a) and right dorsal end 106(c) may connect to right axial section 104(b), as illustrated in FIG. 5 and in FIG. 6A. Second, left dorsal end 106(b) may connect to right axial section 104(b) and right dorsal end 106(c) may connect to left axial section 104(a), as illustrated in FIG. 6B. In each of these examples, the distance between the terminus point of each axial section (e.g., terminus point 500 in FIG. 5) and the point on each axial section at which the corresponding dorsal end connects (e.g., connection point 502 in FIG. 5) may be any suitable distance (e.g., 0 inches, 1 inch, 2 inches 2.4 inches, 6 inches, etc.).

In examples in which left axial section 104(a) overlaps right axial section 104(b), the dorsal ends of top strap 106 may also connect to axial strap 104 in at least two ways. First, left dorsal end 106(b) may connect to left axial section 104(a) and right dorsal end 106(c) may connect to right axial section 104(b), as illustrated in FIG. 7 and in FIG. 8A. Second, left dorsal end 106(b) may connect to right axial section 104(b) and right dorsal end 106(c) may connect to left axial section 104(a), as illustrated in FIG. 8B. In each of these examples, the distance between the terminus point of each axial section and the point on each axial section at which the corresponding dorsal end connects may be any suitable distance (e.g., 0 inches, 1 inch, 2 inches, 2.4 inches, 6 inches, etc.).

The disclosed attachment mechanism may rely on a variety of mechanisms to removably attach the two axial sections of axial strap 104, which may, as discussed above, include an overlapping axial section and an underlapping axial section. In some examples, the attachment mechanism may include a first component, attached to one of the two axial sections, that is configured to mate with a second component, attached to the other axial section. For example, as illustrated in FIG. 1, the attachment mechanism (i.e., attachment mechanism 108) may represent a hook and loop fastener system (e.g., a VELCRO system) including a first strip of fabric attached (e.g., sewn and/or glued) to the interior surface of the overlapping axial section and a second strip of fabric (configured to mate to the first strip of fabric) attached to the exterior surface of the underlapping axial section.

As another example, the attachment mechanism may represent a snap fastener system including a pair of interlocking disks, in which a first disk is attached to the interior surface of the overlapping axial section and a second disk is attached to the exterior surface of the underlapping axial section. In this example, one of the disks may include a circular lip configured to fit into a groove of the other disk when a certain amount of force is applied while pushing the disks together.

As another example, the attachment mechanism may represent a strap adjuster system, such as a quick-release strap adjuster system and/or a ladder lock system. In this example, one of the axial sections may include an adjuster buckle with locking bars and the other axial section may weave through the locking bars of the adjuster buckle, thereby attaching the two axial sections.

In some examples, the attachment mechanism may be adjusted to achieve a desired amount of overlap between left axial section 104(a) and right axial section 104(b), which may in turn determine the overall circumference of axial strap 104. Thus, a user may increase the amount of overlap to decrease the circumference of axial strap 104 (e.g., to fit on a smaller head) or decrease the amount of overlap to increase the circumference of axial strap 104 (e.g., to fit on a larger head).

The disclosed attachment mechanism may be adjusted to control the amount of overlap in a variety of ways, depending on the type of mechanism which the attachment mechanism represents. For example, in instances in which the attachment mechanism represents a hook and loop fastener system, at least one of the strips of fabric attached to left axial section 104(a) or right axial section 104(b) may be long enough to connect to the opposing strip of fabric at a variety of points along the strip of fabric. Using FIG. 5 as a specific example, right axial section 104(b) may connect to left axial section 104(a) at point 504 or at point 506.

As another example, in instances in which the attachment mechanism represents a snap fastener system, at least one of the axial sections may include multiple disks, each of which may be located at a different point on the axial section. In this example, the opposing axial section may connect with the axial section at any of the different points. As another example, in instances in which the attachment mechanism represents a strap adjuster system, the amount of strap weaved through the locking bars of the adjuster buckle may be adjusted.

In some additional or alternative embodiments, the fabric with which axial strap 104 and/or top strap 106 is constructed may include a predetermined amount of stretch. Due to the stretch in the fabric, the fabric in these embodiments may shrink when placed on a smaller head and may expand when placed on a larger head. In one such embodiment, the fabric which forms strap assembly 100 may also be configured to cover head-mounted display 102.

In some examples, strap assembly 100 may also include an additional attachment mechanism that connects top strap 106 to head-mounted display 102. In these examples, the additional attachment mechanism may include one or more of the features of the attachment mechanism (e.g., attachment mechanism 108) discussed above. In one embodiment, the additional attachment system may also be adjustable to control a length of top strap 106.

In one example, the instant disclosure may include a head-mounted-display system including a head-mounted display and a strap assembly with at least one of the features discussed above. Also, in one embodiment, the instant disclosure may include a method for manufacturing, assembling, using, adjusting and/or otherwise configuring or creating a head-mounted-display system with one or more of the features described herein.

Figure 9:
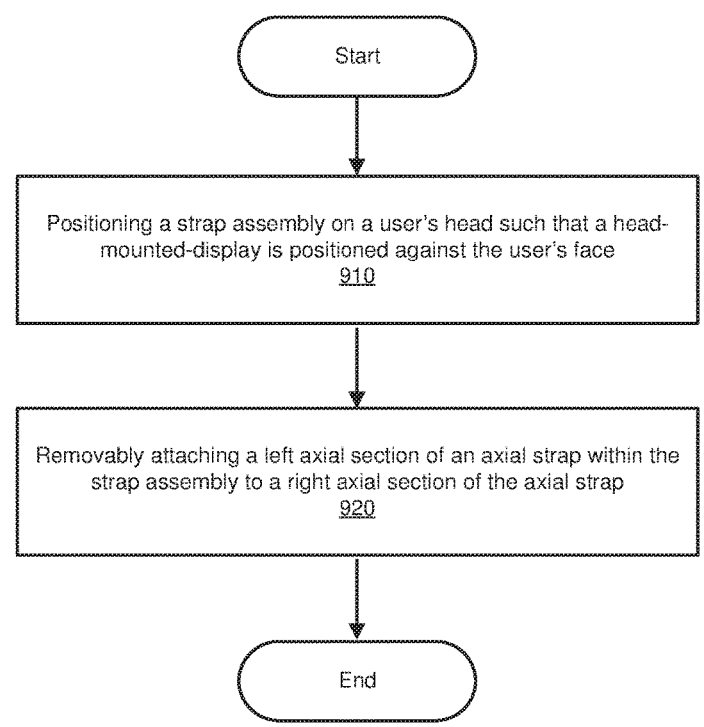
FIG. 9 is a flow diagram of a method for positioning a head-mounted-display system, which includes an adjustable strap assembly such as the adjustable strap assembly of FIG. 1 and/or the adjustable strap assembly of FIG. 7, on a user's head.

FIG. 9 is a flow diagram of an exemplary method 900 for positioning a head-mounted-display system on a user's head. As shown in FIG. 9, at step 910, the method may include positioning a strap assembly with one or more of the features described herein (including, for example, an axial strap, a top strap, and an attachment mechanism) on a user's head such that a head-mounted display is positioned against the user's face. In one example, positioning the strap assembly may include (1) positioning the axial strap circumferentially around the user's head with a left axial section of the axial strap being positioned around the left side of the user's head and a right axial section of the axial strap being positioned around the right side of the user's head and (2) positioning the top strap along the top of the user's head such that a left dorsal end of the top strap is positioned against the left side of the user's head and a right dorsal end of the top strap is positioned against the right side of the user's head. Then, at step 920, the method may include removably attaching, at the back of the user's head, the left axial section of the axial strap to the right axial section of the axial strap.

Figure 10:
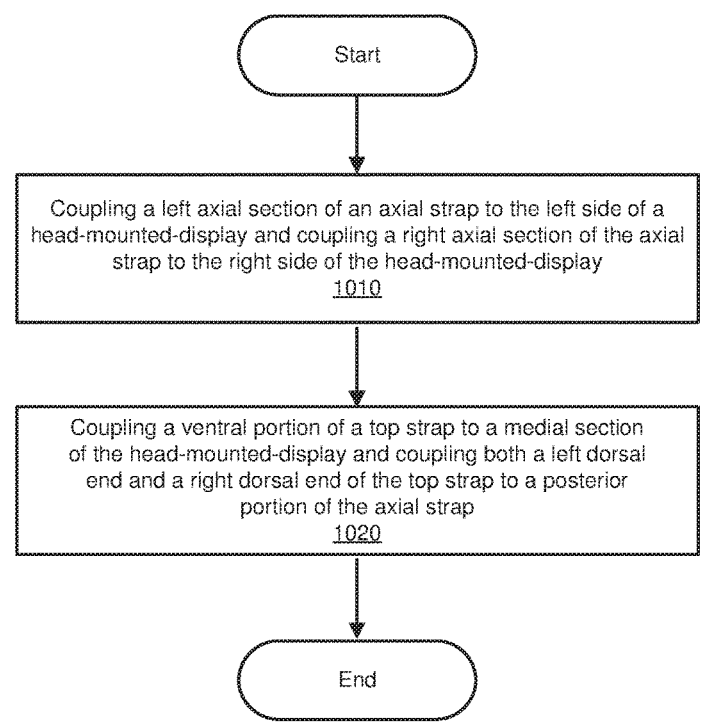
FIG. 10 is a flow diagram of a method for assembling a head-mounted-display system that includes an adjustable strap assembly such as the adjustable strap assembly of FIG. 1 and/or the adjustable strap assembly of FIG. 7.

FIG. 10 is a flow diagram of an exemplary method 1000 for assembling a head-mounted-display system with one or more of the features described herein. As shown in FIG. 10, at step 1010 the method may include coupling a left axial section of an axial strap (such as axial strap 104) to the left side of a head-mounted display (such as head-mounted display 102) and coupling a right axial section of the axial strap to the right side of the head-mounted display. Then, at step 1020, the method may include coupling a ventral portion of a top strap (such as top strap 106) to a medial section of the head-mounted display and coupling both a left dorsal end and a right dorsal end of the top strap to a posterior portion of the axial strap (e.g., using one of the exemplary configurations described above in connection with FIGS. 5-8). The axial strap and the top strap may be coupled to the head-mounted-display system in a variety of ways. For example, the axial strap and/or the top strap may be sewn and/or glued to the head-mounted-display system. In one embodiment, the axial strap and/or the top strap may be removably attached to the head-mounted-display system (e.g., using one or more of the features described above in connection with the attachment mechanism). The steps shown in FIGS. 9 and 10 may be performed by any individual and/or by any suitable type or form of manual and/or automated apparatus.

As discussed throughout the instant disclosure, the disclosed systems, methods, and devices may provide a head-mounted-display strap system designed to symmetrically orient a top strap such that the weight of the top strap is evenly distributed on the user's head. The top strap may include a front-facing end connected to a head-mounted display and a rear-facing end that is split in two, with each split end connecting to a respective end portion of a side strap assembly configured to be axially positioned around the circumference of the user's head. The end portions of the side strap assembly may be removably attached to one another in an overlapping fashion, with the resulting assembly (i.e., the top-strap split ends and the connected end portions of the side-strap assembly) forming a generally triangular shape. VELCRO, snaps, quick-release strap adjusters, and/or any other suitable attachment mechanism may be used to connect the end portions of the side-strap assembly, enabling a user to quickly and easily adjust the tension of the strap system without negatively impacting the symmetrical orientation of the top strap and, thus, the weight distribution of the head-mounted display.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A strap assembly comprising:
    an axial strap, connected to a display device, configured to be worn around the circumference of a user's head in a manner that holds the display device against the user's face, the axial strap comprising:
        a left axial section, coupled to a left side of the display device, configured to be worn around the left side of the user's head; and
        a right axial section, coupled to a right side of the display device, configured to be worn around the right side of the user's head;
    an adjustable attachment mechanism configured to removably attach the right axial section to the left axial section such that the right axial section overlaps the left axial section or the left axial section overlaps the right axial section; and
    a top strap, configured to be worn along the top of the user's head, comprising:
        a ventral end coupled to a medial section of the display device; and
        a dorsal end that splits into a left dorsal end and a right dorsal end, each of which couples to the axial strap, wherein:
            the left dorsal end is configured to be worn against the left side of the user's head and the right dorsal end is configured to be worn against the right side of the user's head;
            the right dorsal end of the top strap connects to the left axial section of the axial strap; and
            the left dorsal end of the top strap connects to the right axial section of the axial strap.

2. The strap assembly of claim 1, wherein the display device is configured to rest over the user's eyes.

3. The strap assembly of claim 1, wherein an amount of overlap between the right axial section and the left axial section is adjustable.

4. The strap assembly of claim 1, wherein the amount of overlap between the right axial section and the left axial section determines an overall circumference of the axial strap.

5. The strap assembly of claim 1, wherein a material of the strap assembly comprises at least one of:
    a plastic material;
    a leather material;
    a cloth material;
    a woven material; or
    a neoprene material.

6. The strap assembly of claim 1, wherein the adjustable attachment mechanism comprises at least one of:
    a hook and loop fastener system;
    a snap fastener system; or
    a strap adjuster system.

7. The strap assembly of claim 6, wherein the strap adjuster system comprises at least one of:
    a quick-release strap adjuster system; or
    a ladder lock system.

8. The strap assembly of claim 1, wherein the right and left dorsal ends are configured to pull apart when the strap assembly is placed on the user's head, such that the right and left dorsal ends form a triangular shape with the axial strap.

9. The strap assembly of claim 1, wherein the display device comprises a head-mountable virtual reality headset.

10. A display system comprising:
    a display device; and
    a strap assembly comprising:
        an axial strap, connected to the display device, configured to be worn around the circumference of a user's head in a manner that holds the display device against the user's face, the axial strap comprising:
            a left axial section, coupled to a left side of the display device, configured to be worn around the left side of the user's head; and
        a right axial section, coupled to a right side of the display device, configured to be worn around the right side of the user's head;
        an adjustable attachment mechanism configured to removably attach the right axial section to the left axial section such that the right axial section overlaps the left axial section or the left axial section overlaps the right axial section; and
        a top strap, configured to be worn along the top of the user's head, comprising:
            a ventral end coupled to a medial section of the display device; and
            a dorsal end that splits into a left dorsal end and a right dorsal end, each of which couples to the axial strap, wherein:

the left dorsal end is configured to be worn against the left side of the user's head and the right dorsal end is configured to be worn against the right side of the user's head;

the right dorsal end of the top strap connects to the left axial section of the axial strap; and the left dorsal end of the top strap connects to the right axial section of the axial strap.

11. The display system of claim 10, wherein the display device is configured to rest over the user's eyes.

12. The display system of claim 10, wherein an amount of overlap between the right axial section and the left axial section is adjustable.

13. The display system of claim 10, wherein the amount of overlap between the right axial section and the left axial section determines an overall circumference of the axial strap.

14. The display system of claim 10, wherein a material of the strap assembly comprises at least one of:
 a plastic material;
 a leather material;
 a cloth material;
 a woven material; or
 a neoprene material.

15. The display system of claim 10, wherein the adjustable attachment mechanism comprises at least one of:
 a hook and loop fastener system;
 a snap fastener system; or
 a strap adjuster system.

16. The display system of claim 15, wherein the strap adjuster system comprises at least one of:
 a quick-release strap adjuster system; or
 a ladder lock system.

17. The display system of claim 10, wherein the right and left dorsal ends are configured to pull apart when the strap assembly is placed on the user's head, such that the right and left dorsal ends form a triangular shape with the axial strap.

18. A method comprising:
 positioning an adjustable strap assembly on a user's head, such that a display device, attached to the strap assembly, is positioned against the user's face, wherein:
  the strap assembly comprises an axial strap, a top strap, and an adjustable attachment mechanism;
  the axial strap comprises a left axial section coupled to a left side of the display device and a right axial section coupled to a right side of the display device;
  the adjustable attachment mechanism is configured to removable attach the right axial section to the left axial section such that the right axial section overlaps the left axial section or the left axial section overlaps the right axial section;
  the top strap comprises a ventral end attached to a medial section of the display device and a dorsal end that splits into a left dorsal end and a right dorsal end, each of which couples to the axial strap;
  the right dorsal end of the top strap connects to the left axial section of the axial strap;
  the left dorsal end of the top strap connects to the right axial section of the axial strap; and
 positioning the strap assembly on the user's head comprises:
  positioning the axial strap circumferentially around the user's head with the left axial section being positioned around the left side of the user's head and the right axial section being positioned around the right side of the user's head; and
  positioning the top strap along the top of the user's head such that the left dorsal end is positioned against the left side of the user's head and the right dorsal end is positioned against the right side of the user's head; and
 removably attaching, at the back of the user's head, the left axial section of the axial strap to the right axial section of the axial strap, by overlapping the right axial section over the left axial section or by overlapping the left axial section over the right axial section, such that a pressure exerted by the attached strap assembly holds the display device in place against the user's face.

19. The method of claim 18, further comprising increasing an amount of overlap between the left and right axial sections to decrease the circumference of the axial strap.

20. The method of claim 18, further comprising decreasing the amount of overlap between the left and right axial sections to increase the circumference of the axial strap.

* * * * *